United States Patent
Mittal et al.

(10) Patent No.: US 9,557,797 B2
(45) Date of Patent: Jan. 31, 2017

(54) ALGORITHM FOR PREFERRED CORE SEQUENCING TO MAXIMIZE PERFORMANCE AND REDUCE CHIP TEMPERATURE AND POWER

(71) Applicant: QUALCOMM Incorporated, San Diego, CA (US)

(72) Inventors: Rajat Mittal, San Diego, CA (US); Mehdi Saeidi, San Diego, CA (US); Tao Xue, San Diego, CA (US); Ronald Frank Alton, Oceanside, CA (US); Rajit Chandra, San Diego, CA (US); Sachin Dasnurkar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 14/319,393

(22) Filed: Jun. 30, 2014

(65) Prior Publication Data

US 2015/0338902 A1  Nov. 26, 2015

Related U.S. Application Data

(60) Provisional application No. 62/000,855, filed on May 20, 2014.

(51) Int. Cl.
  *G06F 1/32* (2006.01)
  *G06F 9/50* (2006.01)

(52) U.S. Cl.
  CPC ............ *G06F 1/3234* (2013.01); *G06F 1/329* (2013.01); *G06F 1/3293* (2013.01);
(Continued)

(58) Field of Classification Search
  CPC ..................................................... G06F 1/3293
(Continued)

(56) References Cited

U.S. PATENT DOCUMENTS

| 7,373,269 | B2 | 5/2008 | Furuichi et al. |
| 8,055,822 | B2 * | 11/2011 | Bernstein ............. G06F 9/3851 |
| | | | 702/118 |

(Continued)

FOREIGN PATENT DOCUMENTS

| JP | H0876874 A | 3/1996 |
| JP | 2006099624 A | 4/2006 |

(Continued)

OTHER PUBLICATIONS

International Search Report and Written Opinion—PCT/US2015/029983—ISA/EPO—Sep. 2, 2015.

(Continued)

*Primary Examiner* — Thomas Lee
*Assistant Examiner* — Volvick Derose
(74) *Attorney, Agent, or Firm* — The Marbury Law Group, PLLC

(57) ABSTRACT

Aspects include computing devices, systems, and methods for selecting preferred processor core combinations for a state of a computing device. In an aspect, a state of a computing device containing the multi-core processor may be determined. A number of current leakage ratios may be determined by comparing current leakages of the processor cores to current leakages of the other processor cores. The ratios may be compared to boundaries for the state of the computing device in respective inequalities. A processor core associated with a number of boundaries may be selected in response to determining that the respective inequalities are true. The boundaries may be associated with a set of processor cores deemed preferred for an associated (Continued)

state of the computing device. The processor core present in the set of processor cores for each boundary of a true inequality may be the selected processor core.

29 Claims, 10 Drawing Sheets

(52) U.S. Cl.
CPC .......... *G06F 9/5094* (2013.01); *G06F 1/3203* (2013.01); *Y02B 60/142* (2013.01)

(58) Field of Classification Search
USPC ........................................................ 713/300
See application file for complete search history.

(56) References Cited

U.S. PATENT DOCUMENTS

| | | | |
|---|---|---|---|
| 8,566,836 B2* | 10/2013 | Ramaraju | G06F 9/5044 712/225 |
| 8,571,847 B2 | 10/2013 | Cher et al. | |
| 8,595,731 B2 | 11/2013 | Bose et al. | |
| 8,819,686 B2 | 8/2014 | Memik et al. | |
| 9,342,374 B2 | 5/2016 | Shows | |
| 9,442,773 B2 | 9/2016 | Sur et al. | |
| 9,442,774 B2 | 9/2016 | Sur et al. | |
| 2004/0168097 A1 | 8/2004 | Cook et al. | |
| 2004/0215987 A1* | 10/2004 | Farkas | G06F 1/3203 713/300 |
| 2005/0086029 A1 | 4/2005 | Cascaval et al. | |
| 2006/0070074 A1 | 3/2006 | Maeda et al. | |
| 2006/0095911 A1 | 5/2006 | Uemura et al. | |
| 2006/0095913 A1* | 5/2006 | Bodas | G06F 9/5027 718/100 |
| 2006/0107262 A1* | 5/2006 | Bodas | G06F 9/5027 718/100 |
| 2007/0124618 A1 | 5/2007 | Aguilar et al. | |
| 2007/0260895 A1* | 11/2007 | Aguilar, Jr. | G06F 1/206 713/300 |
| 2008/0022076 A1 | 1/2008 | Krieger et al. | |
| 2009/0007120 A1 | 1/2009 | Fenger et al. | |
| 2009/0100437 A1 | 4/2009 | Coskun et al. | |
| 2009/0150893 A1 | 6/2009 | Johnson et al. | |
| 2009/0254909 A1 | 10/2009 | Hanson et al. | |
| 2009/0328055 A1* | 12/2009 | Bose | G06F 1/3203 718/105 |
| 2010/0153954 A1 | 6/2010 | Morrow et al. | |
| 2010/0244942 A1* | 9/2010 | Okano | H03K 19/0016 327/544 |
| 2011/0023047 A1 | 1/2011 | Memik et al. | |
| 2011/0078469 A1 | 3/2011 | Therien | |
| 2011/0138395 A1 | 6/2011 | Wolfe | |
| 2012/0005683 A1 | 1/2012 | Bower, III et al. | |
| 2012/0023345 A1* | 1/2012 | Naffziger | G06F 1/3206 713/320 |
| 2012/0272086 A1 | 10/2012 | Anderson et al. | |
| 2013/0073875 A1 | 3/2013 | Anderson et al. | |
| 2013/0246820 A1 | 9/2013 | Branover et al. | |
| 2014/0115363 A1 | 4/2014 | Tu et al. | |
| 2014/0281609 A1* | 9/2014 | Hanumaiah | G06F 1/206 713/320 |
| 2014/0344827 A1* | 11/2014 | Mavila | G06F 9/4893 718/104 |
| 2015/0227391 A1 | 8/2015 | Paul et al. | |

FOREIGN PATENT DOCUMENTS

| | | | |
|---|---|---|---|
| JP | 2006133995 A | 5/2006 | |
| JP | 2008165815 A | 7/2008 | |
| WO | 03083693 A1 | 10/2003 | |
| WO | 2010068855 A2 | 6/2010 | |

OTHER PUBLICATIONS

Method to improve homogeneous multi-core chip efficiency by altering core mapping based on core Performance data, Apr. 26, 2011, 4 pages.
<Kumar R., et al.,"Single-ISA heterogeneous multi-core architectures: the potential for processor power reduction", Microarchitecture, 2003. Micro-36. Proceedings. 36th Annual IEEE/ACM International Symposium on Dec. 3-5, 2003, Piscataway, NJ, USA.IEEE, Dec. 3, 2003 (Dec. 3, 2003), pp. 81-92, KP010674229, DOI: 10.1109/MICRO.2003.1253185 ISBN: 97-7695-2043-8.

* cited by examiner

IDDqn/IDDqi.

ALGORITHM FOR PREFERRED CORE SEQUENCING TO MAXIMIZE PERFORMANCE AND REDUCE CHIP TEMPERATURE AND POWER

RELATED APPLICATIONS

This application claims the benefit of priority to U.S. Provisional Application No. 62/000,855 entitled "Algorithm For Preferred Core Sequencing To Maximize Performance And Reduce Chip Temperature" filed May 20, 2014, the entire contents of which are hereby incorporated by reference.

BACKGROUND

Demand for more performance in thin systems (e.g. smartphones and tablets) is increasing. The industry response to this demand has been the addition of more processor cores on processor chips to improve performance. The additional processor cores can provide higher performance, but the increase in processor cores results in the use of more power, which leads to higher temperatures and shorter battery life. Higher temperatures and shorter battery life negatively impact reliability and user experience.

Regardless of the number of processor cores, most user applications are still written so that processing is concentrated in just two cores (i.e., dual processor core intensive), hence adding more processor cores may not directly translate into better user experience/performance. For example, in a quad-processor system, two of the processor cores may not be used for process-intensive user applications. Further, the combination of processor cores selected for processing the user applications may not be the preferred processor cores for the applications.

SUMMARY

The methods and apparatuses of various aspects provide circuits and methods for preferred core sequencing to maximize performance and reduce chip temperature and power. Aspect methods may include determining a state of the computing device, determining a plurality of ratios of current leakage by comparing a current leakage of each of a plurality of processor cores to current leakages of other processor cores of the plurality of processor cores, comparing the plurality of ratios of current leakage to a plurality of boundary values corresponding to the state of the computing device in a plurality of inequalities, and selecting a processor core associated with at least two boundary values in response to determining that at least two of the plurality of inequalities are true.

In an aspect, determining the plurality of ratios of current leakage by comparing the current leakage of each of the plurality of processor cores to current leakages of other processor cores of the plurality of processor cores may include determining a first ratio of a current leakage by comparing a current leakage of a first processor core to a current leakage of a second processor core, and determining a second ratio of current leakage by comparing a current leakage of a third processor core to the current leakage of the second processor core, comparing the plurality of ratios of current leakage to the plurality of boundary values corresponding to the state of the computing device in the plurality of inequalities may include comparing the first ratio to a first boundary value corresponding to the state of the computing device in a first inequality, and comparing the second ratio of current leakage to a second boundary value corresponding to the state of the computing device in a second inequality, and selecting the processor core associated with the at least two boundary values in response to determining that the at least two of the plurality of inequalities are true may include selecting a preferred processor core associated with the first boundary value and the second boundary value in response to determining that the first inequality and the second inequality are true.

An aspect method may include storing a plurality of boundary values each associated with a state of the computing device and a set of processor cores determined to be preferred for use during the state of the computing device, and loading the plurality of boundary values for the state of the computing device.

An aspect method may include retrieving the current leakage of the plurality of processor cores from a storage device of the multi-core processor.

In an aspect, selecting the processor core associated with the at least two boundary values in response to determining that the at least two inequalities are true may include retrieving a plurality of sets of processor cores associated with the at least two boundary values, comparing each of the plurality of sets of processor cores with other sets within the plurality of sets of processor cores, and selecting the processor core that is present in at least two sets of processor cores within the plurality of sets of processor cores.

In an aspect, determining the state of the computing device may include selecting a current state of the computing device or a predicted state of the computing device.

An aspect method may include engaging the selected processor core to execute a task in combination with another processor core.

An aspect method may include composing a processor core bring-up sequence in which the selected processor core is next in the processor core bring-up sequence.

In an aspect determining the plurality of ratios of current leakage by comparing the current leakage of each of the plurality of processor cores to current leakages of other processor cores of the plurality of processor cores may include expressing the plurality of ratios of current leakage as ratios of static current leakage in a digital domain at a quiescent state (IDDq) for each of the plurality of processor cores such that the plurality of ratios of current leakage include IDDqi+1/IDDqi, IDDqi+2/IDDqi, IDDqi+3/IDDqi, IDDqi+4/IDDqi, . . . IDDqn/IDDqi.

An aspect includes a computing device having a processor configured with processor instructions to perform operations of one or more of the aspect methods described above.

An aspect includes a non-transitory processor-readable medium having stored thereon processor-executable software instructions to cause a processor to perform operations of one or more of the aspect methods described above.

An aspect includes a computing device having means for performing functions of one or more of the aspect methods described above.

BRIEF DESCRIPTION OF THE DRAWINGS

The accompanying drawings, which are incorporated herein and constitute part of this specification, illustrate example aspects of the invention, and together with the general description given above and the detailed description given below, serve to explain the features of the invention.

FIG. 4B is an example of a plot of

DETAILED DESCRIPTION

Figure 1:
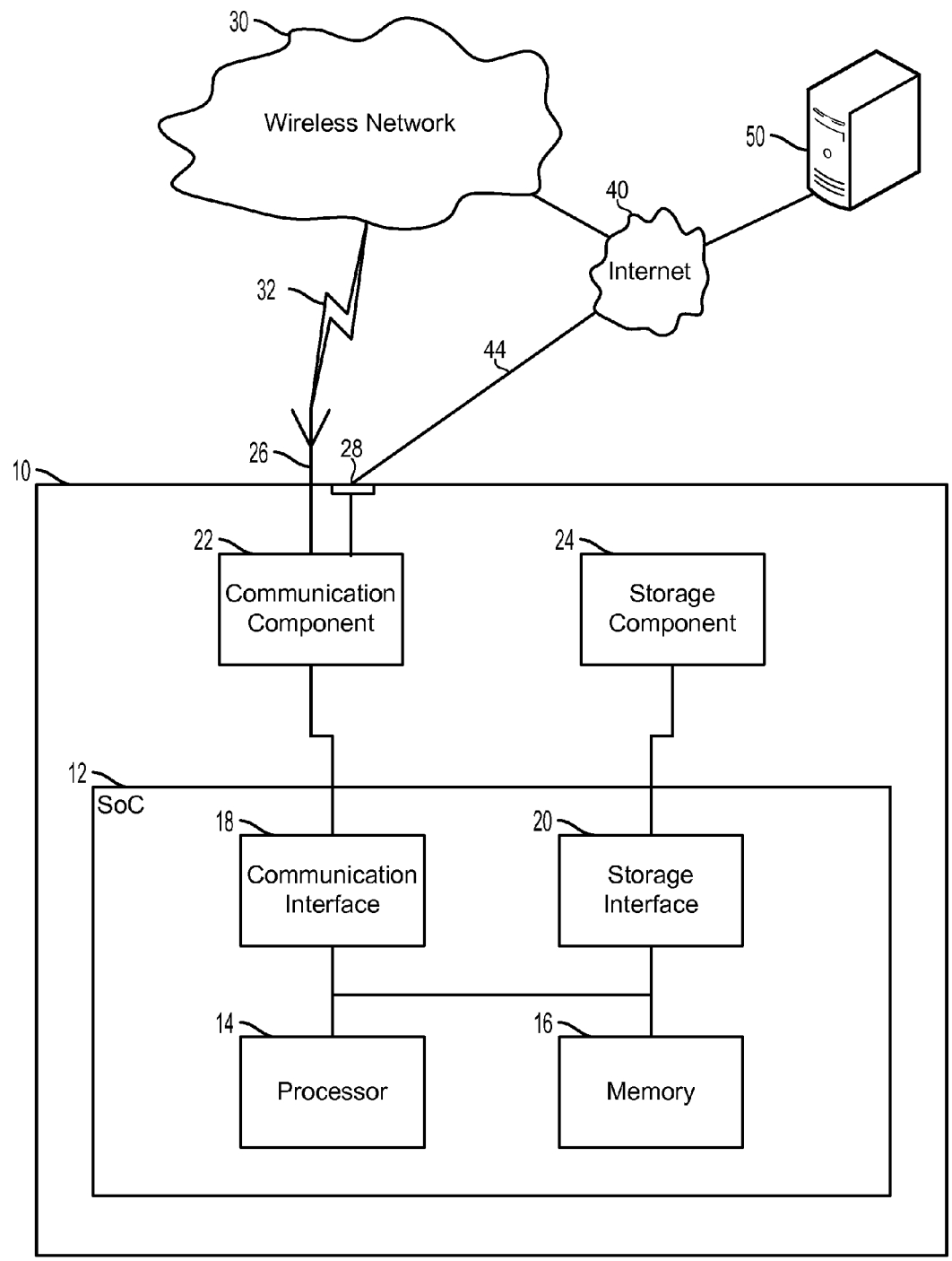
FIG. 1 is a component block diagram illustrating a computing device suitable for implementing an aspect.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "computing device" and "mobile device" are used interchangeably herein to refer to any one or all of cellular telephones, smartphones, personal or mobile multimedia players, personal data assistants (PDA's), laptop computers, tablet computers, smartbooks, ultrabooks, palmtop computers, wireless electronic mail receivers, multimedia Internet enabled cellular telephones, wireless gaming controllers, and similar personal electronic devices that include a memory, and a multi-core programmable processor. While the various aspects are particularly useful for mobile computing devices, such as smartphones, which have limited resources, the aspects are generally useful in any electronic device that implements a plurality of memory devices and a limited power budget where reducing the power consumption of the processors can extend the battery-operating time of the mobile computing device.

The term "system-on-chip" (SoC) is used herein to refer to a set of interconnected electronic circuits typically, but not exclusively, including a hardware core, a memory, and a communication interface. A hardware core may include a variety of different types of processors, such as a general purpose processor, a central processing unit (CPU), a digital signal processor (DSP), a graphics processing unit (GPU), an accelerated processing unit (APU), an auxiliary processor, a single-core processor, and a multi-core processor. A hardware core may further embody other hardware and hardware combinations, such as a field programmable gate array (FPGA), an application-specific integrated circuit (ASCI), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

In an aspect preferred processor cores of a multi-core processor may be determined for a specific state of a system, such as a specific workload, temperature, power, or frequency. Selecting the preferred processor cores to perform tasks may reduce power consumption and the temperature of the processor cores, and/or may increase performance of the processor cores. The process for determining the preferred processor cores may also determine the preferred processor core power up sequence, or bring-up sequence. For a multi-core processor with "n" processor cores where there are no limits placed on the number of processor cores engaged ("m") for a specific workload, there may be a total of $^nC_m$ (or n choose m) potential combinations of engaged processor cores. For example, in a quad core processor (i.e., a processor including four processing cores), without limitations on the number of processor cores engaged for the specific workload, the total potential combinations of engaged processor cores can be $^4C_4$ (or four choose four). In an aspect where the number of processor cores engaged for the specific workload is limited, the value m may be the limit of the engaged processor cores. For example, in a quad core processor with a two processor core limit (i.e., two processor cores may be engaged for the specific workload), the total potential combinations of engaged processor cores can be $^4C_2$ (or four choose two).

In an aspect, the preferred processor cores of the multi-core processor may be selected for the specific state of the system from among all of the possible combinations of available processor cores based on a ratio of current leakage of each processor core to each of the other processor cores compared to a parameter determined by the manufacturer for the chip or SoC, which may be determined for a particular chip or a manufacturing lot of chips. The current leakage, also known as the static current leakage, for each processor core may be predetermined and stored in ROM on the multi-core processor by the manufacturer. In an aspect in which the processor cores are asynchronous, the determination may be based on the ratio of current leakage as a function of the voltage of the respective processor core and the static leakage of the processor core. In another aspect the computing device that includes the multi-core processor may determine the current leakage of each processor core by measuring current leakage or power consumption, as well as the temperature and/or operational frequency of the processor cores when processing different loads in order to develop a table of leakage current correlated to temperature and/or frequency.

In an aspect, the ratios of the current leakage (IDDq, which is the current of the processor core in the digital domain and in a quiescent state) of each of the processor cores may be used in an inequality that compares the current leakage ratio to a predetermined value for a specified one or more parameters, such as workload, temperature, power, or frequency for the combination of processor cores of the ratio. The predetermined value may define a boundary for preferred use of the processor cores for the specified parameters, with preferred use based on minimum power consumption, maximum performance, or a combination of both considerations. These boundary values may be determined by testing a large number of SoC's to obtain the leakage current (IDDq) values under different operating conditions, and plotting the results as ratios of the different processor core combinations. The result may be a scatter plot driven by the variability in processor core performance due to manufacturing variability.

As described in greater detail below with respect to FIG. 4, such leakage current (IDDq) values may clump into regions within the plot with defined boundaries (dashed lines) that may be defined as ratios of processor core current leakage values. The defined boundaries may correspond to the boundaries that may be discovered in the test data at specific system states and conditions for which the pairs of processor cores may be selected. The data regions may show the better processor core pairs to select in the various conditions (i.e., the two best cores to selected in a particular operating condition or state). The data region that the multi-core processor is in may be determined by the current leakage ratios. The data region that the processor is operating in may be quickly identified by calculating the ratios and determining the inequality in which the ratios fall. A different scatter plot analysis may be done for each temperature or operating condition, and the identified boundary ratio values may be stored as a table that correlates the boundary ratios to preferred processor cores to temperature/operating conditions. This table may be stored in ROM that is available to all processors, or at least to a processor executing a kernel or scheduler that schedules the processing of threads and application, and thus selects processor cores to handle various applications.

In an aspect, an algorithm may be implemented in a kernel or scheduler that measures current leakage and leverages the data table of boundary ratios to select the best core-pair for executing a particular application (which may depend on the type of processes it performs) under current operating conditions. In an aspect, this algorithm may involve determining a current temperature or operating state, and performing a table look up in ROM to obtain the ratio boundary values that define the data region boundaries and the preferred processor cores associated with each data region. The algorithm may further include measuring current leakage (IDDq) of the processor cores (in a dynamic aspect) or looking up the values from ROM (in a static aspect), calculating the leakage value ratios of the different alternative processor cores to combine with the required processor core, and comparing the calculated leakage value ratios to the ratio boundary values determined from the table look up in order to select the processor core combination to use to execute a particular application. Selecting a processor core combination may involve selecting the two processor cores to use based on the data region in which the leakage value ratios fall. This algorithm enables the processor core pair selection to change with the state of the system.

In addition to selecting a processor core pair based on the temperature or operating state, an aspect algorithm may base the selection on the nature of processing that the application will entail. For example, applications that involve processor-intensive operations (e.g., many complex calculations with few wait states) may perform better with one processor core pair under certain temperature and/or operating conditions, while a different processor-core pair may before better or conserve more power under the same temperature and/or operating conditions executing an application that involves more memory accesses and fewer computations (and thus many wait states during which less heat is generated). As another example, applications that involve a large amount of graphics processing (e.g., games) may operate best using a pair of processor cores that are located farther away from the graphics processor unit (GPU) that generates heat, while applications that involve little or no graphics processing (e.g., communication applications) may operate best using a pair of processor cores that are located closer to the GPU. Thus, the selection of the best pair of processing cores for a particular type of application or processing demand may be SoC design-dependent.

The a processor executing a kernel or scheduler that selects processor cores for executing an application may select the processor cores based on the ratios that compare favorably to the predetermined value in the inequality. The power up sequence, or bring-up sequence, for the processor cores may be determined by selecting to power up the processor cores in the order of most favorable processor core to least favorable processor core.

FIG. 1 illustrates a system including a computing device 10 in communication with a remote computing device 50 suitable for use with the various aspects. The computing device 10 may include an SoC 12 with a processor 14, a memory 16, a communication interface 18, and a storage interface 20. The computing device may further include a communication component 22 such as a wired or wireless modem, a storage component 24, an antenna 26 for establishing a wireless connection 32 to a wireless network 30, and/or the network interface 28 for connecting to a wired connection 44 to the Internet 40. The processor 14 may include any of a variety of hardware cores, as well as a number of processor cores. The SoC 12 may include one or more processors 14. The computing device 10 may include more than SoCs 12, thereby increasing the number of processors 14 and processor cores. The computing device 10 may also include processor cores 14 that are not associated with an SoC 12. Individual processors 14 may be multi-core processors as described below with reference to FIG. 2. The processors 14 may each be configured for specific purposes that may be the same as or different from other processors 14 of the computing device 10. One or more of the processors 14 and processor cores of the same or different configurations may be grouped together.

The memory 16 of the SoC 12 may be a volatile or non-volatile memory configured for storing data and processor-executable code for access by the processor 14. In an aspect, the memory 16 may be configured to store data structures at least temporarily, such as a table for managing predetermined values of boundaries for various preferred combinations of processor cores at various states of the computing device. In aspects in which the table of boundary values are determined and stored by the manufacturer, the memory 16 will include non-volatile read-only memory (ROM) in order to retain the data table for the operating life of the SoC 12.

The computing device 10 and/or SoC 12 may include one or more memories 16 configured for various purposes. In an aspect, one or more memories 16 may be configured to be dedicated to storing the data structures containing the predetermined values. The memory 16 may store the predetermined values in a manner that enables the data structure information to be accessed by the processor executing a kernel or scheduler that selects processor cores for executing an application so that the table data may be used for managing the selection of preferred processor cores from all or a group of the processor cores of the computing device. In an aspect the memory 16 may be on the same SoC 12 as the selected processor cores, or on a different SoC 12. The memory 16 may also be a separate component of the computing device 10 that is not integrated with any other component of the computing device 10, such as an SoC 12. In an aspect a memory device on a different computing device from the computing device 10, such a remote server, may be employed to store and provide the data and processor-executable code, as described above, to the computing device 10.

The communication interface 18, communication component 22, antenna 26, and/or network interface 28, may work in unison to enable the computing device 10 to communicate over a wireless network 30 via a wireless connection 32, and/or a wired network 44 with the remote computing device 50. The wireless network 30 may be implemented using a variety of wireless communication technologies, including, for example, radio frequency spectrum used for wireless communications, to provide the computing device 10 with a connection to the Internet 40 by which it may exchange data with the remote computing device 50.

The storage interface 20 and the storage component 24 may work in unison to allow the computing device 10 to store data on a non-volatile storage medium. The storage component 24 may be configured much like an aspect of the memory 16 in which the storage component 24 may store the data structures, such that the data structures information may be accessed by one or more processors 14. The storage component 24, being non-volatile, may retain the data structures information even after the power of the computing device 10 has been shut off. When the power is turned back on and the computing device 10 reboots, the data structures information stored on the storage component 24 may be available to the computing device 10. The storage interface 20 may control access to the storage device 24 and allow the processor 14 to read data from and write data to the storage device 24.

Some or all of the components of the computing device 10 may be differently arranged and/or combined while still serving the necessary functions. Moreover, the computing device 10 may not be limited to one of each of the components, and multiple instances of each component may be included in various configurations of the computing device 10.

Figure 2:
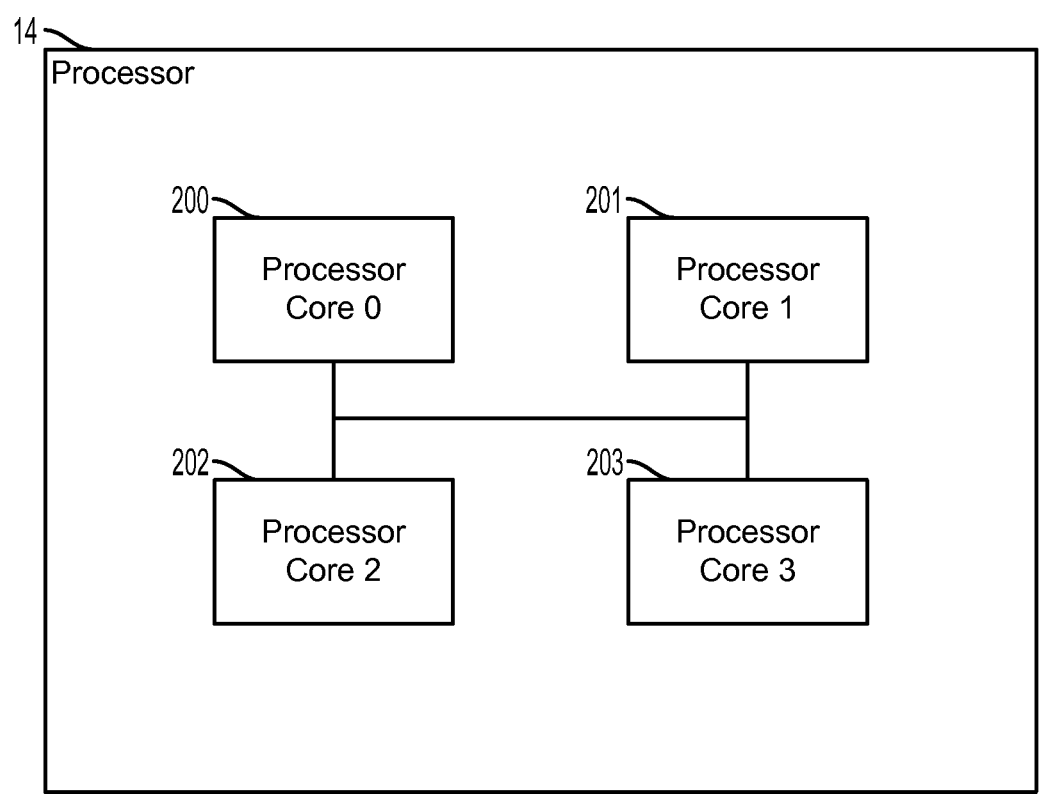
FIG. 2 is a component block diagram illustrating an example multi-core processor suitable for implementing an aspect.

FIG. 2 illustrates a multi-core processor 14 suitable for implementing an aspect. The multi-core processor 14 may have a plurality of homogeneous or heterogeneous processor cores 200, 201, 202, 203. The processor cores 200, 201, 202, 203 may be homogeneous in that, the processor cores 200, 201, 202, 203 of a single processor 14 may be configured for the same purpose and have the same or similar performance characteristics. For example, the processor 14 may be a general purpose processor, and the processor cores 200, 201, 202, 203 may be homogeneous general purpose processor cores. Alternatively, the processor 14 may be a graphics processing unit or a digital signal processor, and the processor cores 200, 201, 202, 203 may be homogeneous graphics processor cores or digital signal processor cores, respectively.

Through variations in the manufacturing process and materials, the performance characteristics of homogeneous processor cores 200, 201, 202, 203, may differ from processor core to processor core within the same multi-core processor 14 or within another multi-core processor 14 using the same designed processor cores.

The processor cores 200, 201, 202, 203 may be heterogeneous in that, the processor cores 200, 201, 202, 203 of a single processor 14 may be configured for different purposes and/or have different performance characteristics. Thus, example processor cores may be configured for the same or different purposes while having the same or different performance characteristics. Example heterogeneous processor cores may include what are known as "big.LITTLE" architectures in which slower, low-power processor cores may be coupled with more powerful and power-hungry processor cores.

In the example illustrated in FIG. 2, the multi-core processor 14 includes four processor cores 200, 201, 202, 203 (i.e., processor core 0, processor core 1, processor core 2, and processor core 3). For ease of explanation, the examples herein may refer to the four processor cores 200, 201, 202, 203 illustrated in FIG. 2. However, the four processor cores 200, 201, 202, 203 illustrated in FIG. 2 and described herein are merely provided as an example and in no way are meant to the various aspects to a four-core processor system. The computing device 10, the SoC 12, or the multi-core processor 14 may individually or in combination include fewer or more than the four processor cores 200, 201, 202, 203 illustrated and described herein.

Figure 3:
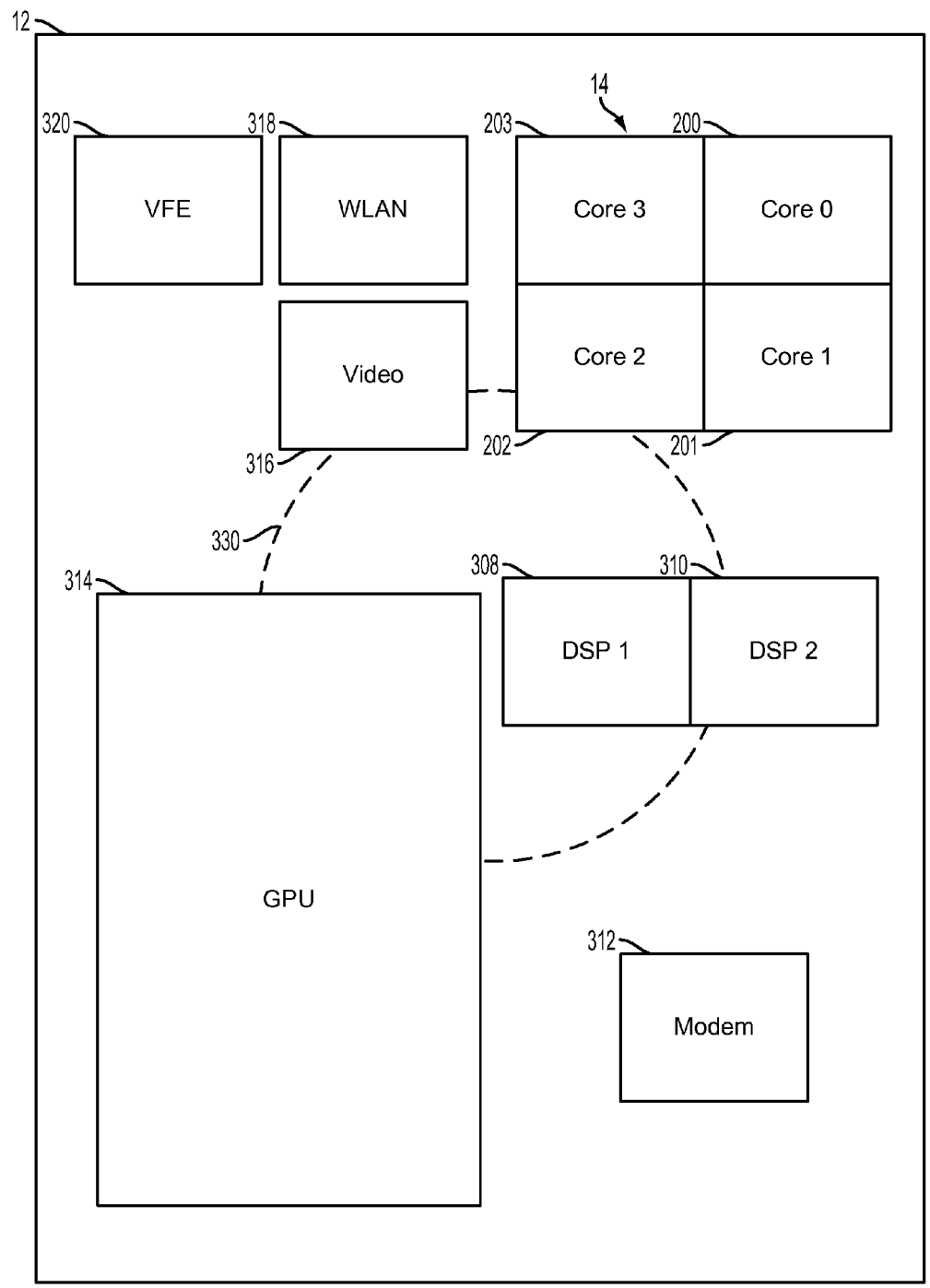
FIG. 3 is a component block diagram illustrating a system on chip ("SoC") configured to select preferred processor core combinations for various states of a computing device in accordance with an aspect.

FIG. 3 illustrates the SoC 12 configured to select preferred processor core combinations for various states of a computing device. The SoC 12 may include numerous components as described above, such as a processor 14 that may be a multi-core general purpose processor containing, for example, the four processor cores 200, 201, 202, 203. The SoC 12 may further include other components, such as a first DSP 1 308, a second DSP 2 310, a modem 312 GPU 314, a video subsystem 316, a wireless local area network (WLAN) transceiver 318, and a video-front-end (VFE) subsystem 320.

Each of the components on the SoC 12 take up physical space on a substrate of the SoC 12, and are arranged on the SoC 12 according to various parameters considered during development and manufacturing. The placement of the components on the SoC 12 may have an effect on the performance of the components, particularly their operating temperatures. When the computing device is operational, heat is generated by the components of the SoC 12, which must be dissipated from the SoC 12 and from the computing device. The operating temperature of a component may be affected by its own power dissipation (self-heating) and the temperature influence of surrounding components (mutual-heating). A mutual heating component may include anything on the SoC 12 that produces temperature. Thus, the operating temperature of each component on the SoC 12 will depend on its placement with respect to heat sinks and to the other components on the SoC generating heat. For example, the processor 14 and the GPU 314 may both generate significant heat when a graphics-intensive application is executing. Where these components are placed close together, one may cause the performance of the other to suffer due to the heat it produces during operation. Thus, as shown in FIG. 3, the processor 14 and the GPU 314 may be placed such that they are far enough from each other that the heat exposure of either component to the other may be reduced. Nevertheless, some processor cores (e.g., core 2 202) may be positioned closer to the GPU 314, and thus more affected by heat generated by the GPU than processor cores located farther away (e.g., core 0 200).

An SoC 12 may include a heat sink 330 (shown in dashed line to illustrate the heat sink positioned on a mounting surface of the SoC 12) to disperse heat away from the SoC 12 and its components. The heat sink 330 may be placed in different locations within the SoC 12 depending on the design, but a common location for heat sinks is near the center of the SoC 12 as illustrated. As heat must pass through the SoC 12 to reach the heat sink 330, those components located farther from the heat sink (e.g., core 0 200) may exhibit higher operating temperatures while operating than those position adjacent to the heat sink (e.g., core 2 202).

The effects of heat on the various components may be particularly prevalent for the processor cores 200, 201, 202, 203 of a multi-core processor 14 as they may be packed close together. As heat increases, the processor cores may become less efficient as current leakage often correlates with the temperature of a processor core. During operation, a processor core will generate some heat which may affect its performance, and it may be subject to the heat of neighboring, operational processor cores and/or other components. Some cores of the processor cores 200, 201, 202, 203 may be positioned closer to the heat sink 330 (e.g., core 202) and, thus may be better able to dissipate heat than the other processor cores (e.g., cores 201, 202, 203). Consequently, the processor cores 201, 202, 203 positioned further from the heat sink 330 may operate at a higher temperature during computationally-intensive process (i.e., processes that involve few wait states) because they may not dissipate heat as well. Generally, the processor cores 200, 201, 202, 203, placed closer to the heat sink will suffer less from the effects of its own heat generation and the heat generated by the other components.

The effects of heat generation and dissipation discussed above are design dependent, and will differ for each SoC design depending upon the number and placement of processors, heat conducting characteristics and placement of the heat sink, and materials of construction of the SoC. Thus, an algorithm for selecting processing core pairs should account for design differences.

In addition to design differences, manufacturing variability may have a significant effect upon the operating temperature, efficiency and processing speed of the various components in an SoC 12. Such variability may impact the best selection of processor cores to perform particular operations under different temperature and operating conditions. Some processor cores 200, 201, 202, 203 may exhibit better or worse current leakage, and thus heat generation. Also, the heat dissipation characteristics of processor cores may vary from lot-to-lot. Similarly, the heat dissipation performance of the heat sink 330 may vary from SoC to SoC and from lot to lot. In an SoC 12 in which a processor core 202 located closest to the heat sink 330 has worse current leakage characteristics, the expected benefit in efficiency resulting from its placement may be overcome by its current leakage characteristics in some temperature and operating conditions. Thus, relying simply on a processor core pair selection preset for a given design SoC that does not account for lot-to-lot variability may result in a less than optimum selection under some circumstances.

Figure 4A:
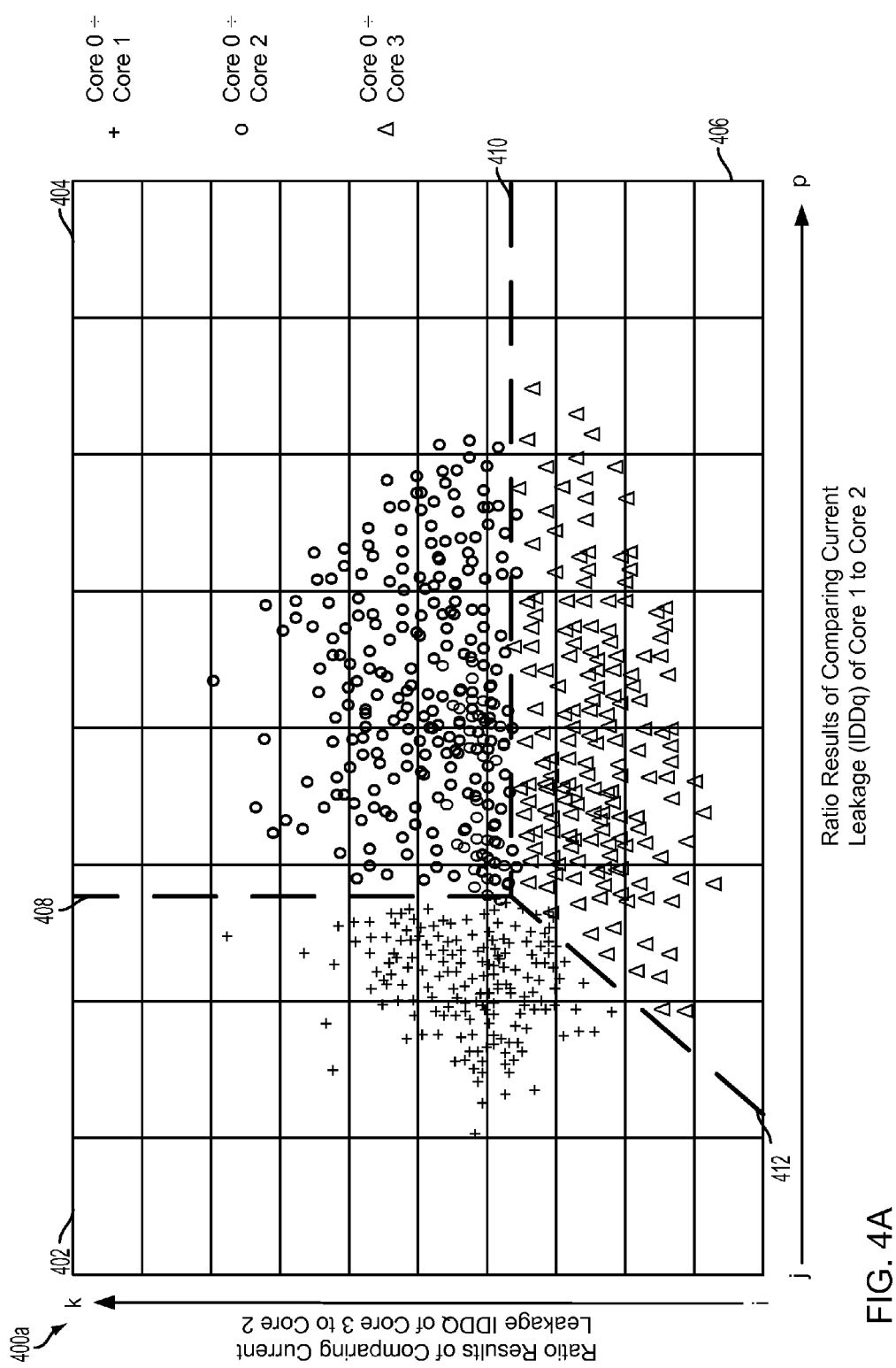
FIG. 4A is an example of a plot of a set of results of a simulation of numerous processors for a state of a computing device in accordance with an aspect.

FIG. 4A illustrates a graph 400a plotting results of a simulation of numerous processors for a state of a computing device. A manufacturer of a processor may perform operational tests on a sample of the processors from a given design or manufacturing lot, and use information obtained on voltage leakage, operating temperature, and operating performance to run simulations of processor performance in various states of a computing device. The states tested and simulated may include variables such as temperature, work load (e.g., computational intensity), power availability, power consumption, and operating frequency. Simulations for various levels and/or combinations of each of these variables may be run on each of the processors and/or processor core combinations in a given SoC design using lot test data. Due to manufacturing variability, each of the processor cores of the processors in an SoC may exhibit different heat generation and operating temperatures under various operating conditions and processing workloads. Such variability may be observed by conducting tests on a large number of sample chips from a given lot. By running the sample chips at different operating temperatures and under different operating conditions (e.g., varying processor workload) and measuring the current leakage and/or temperature, a database of sample data may be obtained. Simulations may also be run using this data to expand the sample set to address different operating temperatures and operating conditions.

Figure 4B:
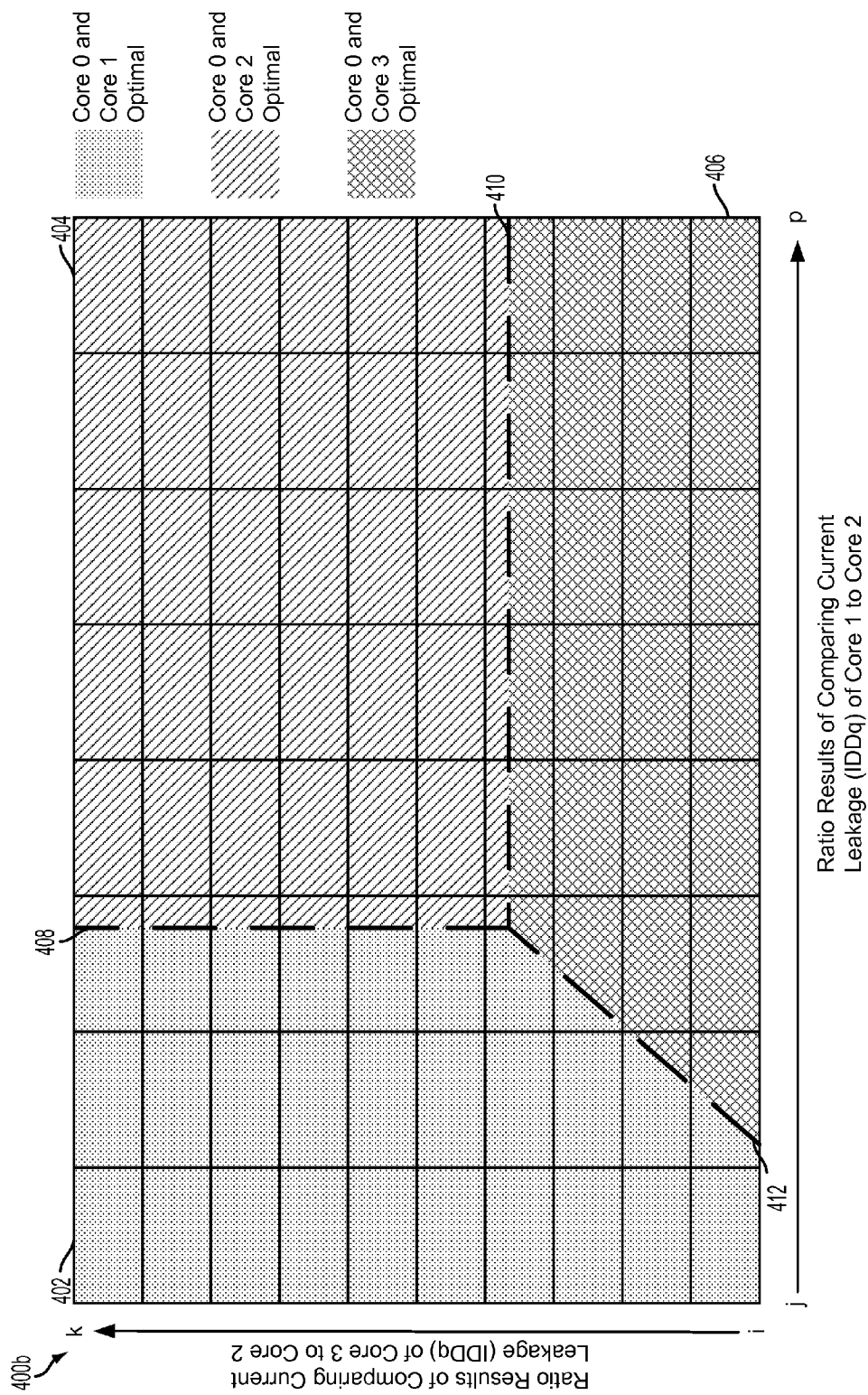

By performing such tests and simulations it has been observed that within a given lot for a particular design, the processor temperature and performance results will tend to clump together into regions. This is illustrated in FIG. 4A which shows plots of the ratios of leakage currents of two cores, specifically the ratio of the leakage current of core 0 to core 1, the ratio of the leakage current of core 0 to core 2, and the ratio of the leakage current of core 0 to core 3 for each chip tested in the simulation. Each point plotted in graph 400a may be the result of the comparisons for a single chip. As illustrated in FIG. 4A, some grouping of the test and simulation results may be determined, and boundaries 408, 410, 412 may be drawn that encompass regions of the plotted data as illustrated in FIG. 4B. These boundaries 408, 410, 412 may be used as ratio values that define regions of test and simulation data that indicate a preferred pairing for processor cores for the type of chip used for the simulations.

Using the results of the simulations based on the lot-testing data, a preferred pairing of processor cores may be chosen for each operating state based on a variety of criteria. In various aspects, the number of processor cores in the preferred combination may be predetermined or may be determined based on the results of the simulations. In various aspects, the processor cores in the preferred combination may be selected based on the results showing certain levels of processing speed, power consumption, temperature, current leakage, or efficiency based on a combination of these factors. For each simulated state, a different scatter plot may be generated and used to identify boundary lines that can be used to select the preferred combination of processor cores for each operating condition. To analyze the preferred processor cores, a parameter of each processor core may be compared with the same parameter of another of the processor cores. Although FIG. 4B shows these parameters to be the current leakage (IDDq) of each of processor cores, in various aspects the parameters may include processing speed, power consumption, temperature, current leakage, or efficiency based on a combination of these parameters. By comparing the results of the analyses, a pattern may be determined that certain combinations of processor cores may be preferable within a certain range of results. For ease of explanation, the examples herein will be described in terms of the parameter of the processor cores being current leakage, but are in no way meant to be limiting.

The scatter plot graph 400a in FIG. 4A illustrates how testing and simulation results can be used to define relative value boundaries illustrated in FIG. 4B that can be used to select preferred combinations of processor cores for particular state based on an analysis of testing and simulation analysis of the performance of processing cores for a given SoC. These results, particularly the identified boundary lines may be viewed as regions of preferred processor core combinations that depend on measureable parameters. This is illustrated in FIG. 4B in the graph 400b that plots regions of preferred two-core combinations for a particular state of a quad-core processor as defined by parameters (e.g. current leakage) and the parametric boundary lines 408, 410, 412 described above. In this example, the graph is a two dimensional representation of the comparison of the results of processor core 1, processor core 2, and processor core 3, presuming that processor core 0 is necessarily engaged for executing a task during the simulated state. Other graphs may be compiled to show the comparison of the results when any of the other processor cores are assumed given to be engaged for executing the processes during the simulated state. The given processor for each comparison may not be limited to only one processor, but may include a combination of processors. For example, a combination of processor cores may already be deemed preferred and the comparison may be used to help select additional processors to be engaged for the simulated state. It may also be possible to plot the comparison of the results of all of the combinations of the processor cores in a multi-dimensional graph having an axis for each pair of processor cores.

In an aspect, the graph 400*b* may represent the comparison of the resulting current leakage of the processor cores 1 and 3, to the resulting current leakage of the processor core 2. In this example, the results of the comparisons of the processor cores result in a pattern that divides the combination of preferred processor cores into three sectors 402, 404, and 406. Sector 402 contains the results of the comparisons of the current leakage when the combination of processor core 0 and processor core 1 are determined to be preferred. Sector 404 contains the results of the comparisons of the current leakage when the combination of processor core 0 and processor core 2 are determined to be preferred. Sector 406 contains the results of the comparisons of the current leakage when the combination of processor core 0 and processor core 3 are determined to be preferred.

The resulting patterns of the comparisons may also produce boundaries 408, 410, 412 separating the sectors 402, 404, and 406 as described above. The boundaries 408, 410, 412, may be defined in terms of the ratios of the parameters of the processor cores to each other used in the analysis of the preferred combination of processor cores. The boundaries 408, 410, and 412 may be represented as values that may be used in an inequality for comparing a ratio of two processor cores to a boundary. These boundary values, along with sets of preferred cores associated with the boundary values may be stored in memory in a data table accessible by the processor executing the kernel or scheduler. The boundary values and the sets of preferred processor cores may be stored for each simulated operating state, and there may be several sets of boundary values for different operation states and conditions stored in the memory.

In an example aspect, the ratios of current leakage described above may define the boundaries 408, 410, 412. In the graph 400*b*, a value of the ratio of the current leakage of core 1 to core 2 may define the boundary 408. Similarly, a value of the ratio of the current leakage of core 3 to core 2 may define the boundary 410. A value of the ratio of the other ratios may define the boundary 412. The boundary values in various aspects may be an equation in terms of the ratios. For example the above described ratios may be designated R1 and R2, and the boundary value may be expressed as R2>R1+0.5. The boundary value may be a value or an equation obtained from fitting the points of the graph that lie on the boundary of the two sectors.

Changing the criteria by which a preferred core is determined may be enabled by different measurements of the performance of the chips tested in the simulations which may result in a different plot on the graph. Similarly, changing the state of the computing device for which the preferred core is determined may also result in a different plot on the graph. Different plots may produce different boundaries separating different sectors. To determine the preferred processor cores for the processor in the computing device for a particular state, the parameters (e.g., current leakage) of the processor may be compared to the boundaries produced from the tests and simulations of the same or similar chip type and state.

While the descriptions of the boundaries herein, such as the exemplary illustrations in FIGS. 4A and 4B and their descriptions, may depict distinct boundaries for each of the comparisons of process cores, it is possible that the boundaries may overlap. The ratios of the processor cores may result in boundaries that are identical. In response to overlapping or identical boundaries, the preferred combination of processor cores may be selected from a group of combinations of processor cores, which meet the criteria as described above. The selection of the preferred combination of processor cores from the group may be based on a run time efficiency parameter.

It should be noted that the graph 400*b* is merely a visual representation of the analysis of the preferred core combinations. In an aspect, the analysis to determine the boundary values and sets of preferred processor cores may be accomplished by a computing device using various methods of mathematical analysis without creating a visual representation.

In operation, the state of the computing device and the parameters for the processor cores may be determined, such as the current leakage or factors that may be used to calculate the current leakage. The current leakage of each processor core may be compared to each other in a ratio. The result of the ratios of current leakage may be compared in an inequality to a boundary value associated with the state of the computing device and the processor cores used in the ratio. For example, CurrentLeakage(Cx) and CurrentLeakage(Cy) may respectively represent the current leakage of two different processor cores. BoundaryValue(z) may represent the boundary value associated with the ratio of current leakage for cores Cx and Cy. The inequality comparing the current leakage for cores Cx and Cy with the associated boundary value may be represented by the following equation:

$$\frac{CurrentLeakage(Cx)}{CurrentLeakage(Cy)} \geq BondaryValue(z) \text{ for } x, y, z = 1, 2, 3, \ldots {}^nC_m.$$

When the result of the inequality is true, the set of preferred processor cores associated with the boundary value of the inequality may be used to determine the preferred combination of processor cores. Generally each preferred core may be selected for at least a pair of true inequalities. The preferred processor core selected may be a preferred processor core that exists in the identified set of the at least two true inequalities. When more than two processor cores are used in the preferred core combination, the comparison of the current leakage for the cores to the boundary values may be executed again for each additional core to engage. The comparisons may be executed for a reduced set of processor cores excluding the cores that are already selected for the preferred core combination. This additional execution of the comparisons may also be used to determine a power up sequence, or bring-up sequence, for the additional cores for the state of the computing device. These additional cores may not be initially preferred for the state of the computing device, yet the cores may be engaged in the order of the power up sequence in response to a need for additional processor cores.

In an aspect, the examples using current leakage may apply to synchronous processor cores. In another aspect where the processor cores are asynchronous, the parameter of the processor cores used in the ratio may be a function of voltage and current leakage. Using the same notation as above for the cores and the boundary values, f(Voltage(Cx), CurrentLeakage(Cx)) and f(Voltage(Cy), CurrentLeakage (Cy)) may represent the functions for cores Cx and Cy, respectively. The inequality comparing the functions for cores Cx and Cy with the associated boundary value may be represented by the following:

$$\frac{f(\text{Voltage}(Cx), \text{CurrentLeakage}(Cx))}{f(\text{Voltage}(Cy), \text{CurrentLeakage}(Cy))} \geq \text{BondaryValue}(z) \text{ for}$$

$$x, y, z = 1, 2, 3, \ldots {}^nC_m.$$

Figure 5:
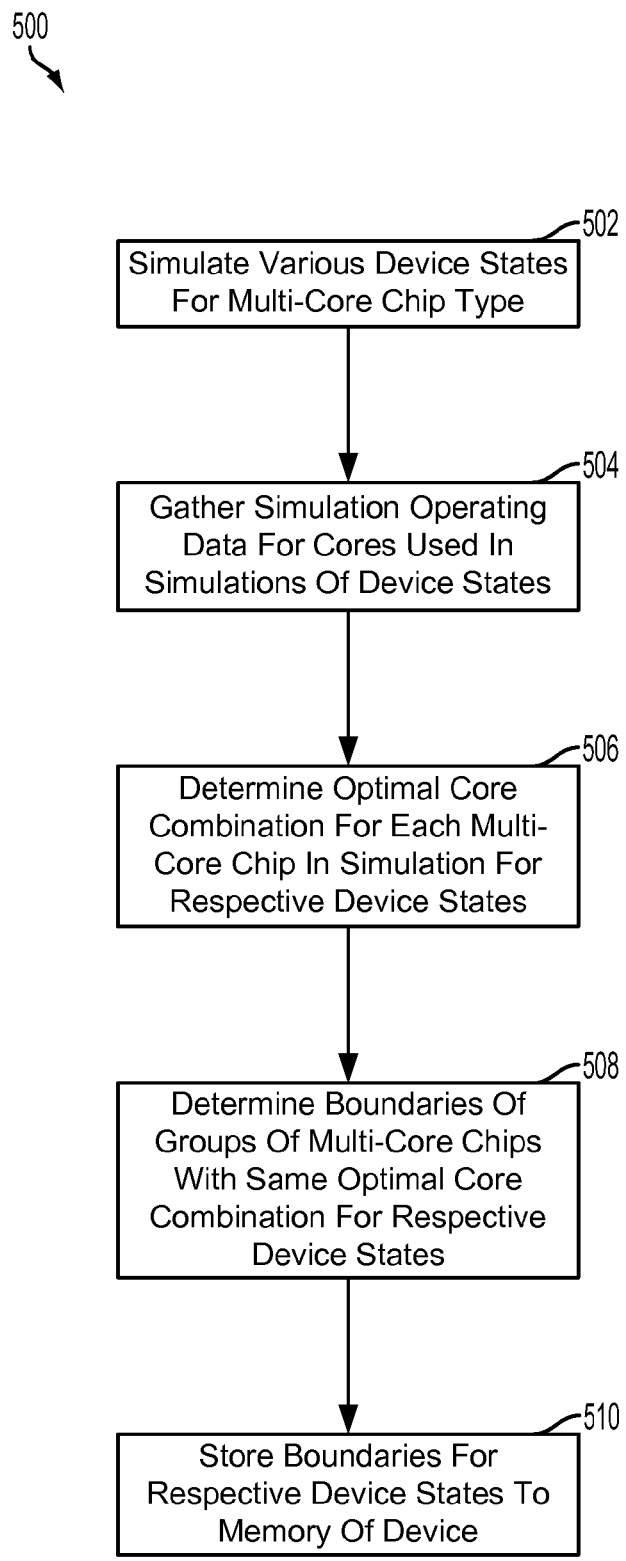
FIG. 5 is a process flow diagram illustrating an aspect method for developing processor core combination selection boundaries.

FIG. 5 illustrates an aspect method 500 for developing processor core combination selection boundaries. A multi-core processor chip manufacturer may produce a variety of homogeneous and/or heterogeneous multi-core processor chip types. To develop the processor core combination selection boundaries for a type of multi-core processor chip, the manufacturer may implement the method 500 on a number of the same type of multi-core processor chips. The manufacturer may also implement the method 500 for different lots or batches of the same type of multi-core processor chip. In block 502, simulations of various computing device states may be run for the type of multi-core processor chips. As discussed above, the computing device state simulations may include various variables such as temperature, work load, power availability, power consumption, and operating frequency. These variables may be used to define the computing device state. Simulations for various levels and/or combinations of each of these variables may be run on each of the number of processors. In block 504, operating data of the processor cores used in the simulations of the computing device states may be gathered. As discussed above, this operating data of the processor cores may include the processing speed/operational frequency, power consumption, temperature, current leakage, or efficiency based on a combination of these parameters. In an aspect, some of these parameters may be used to calculate one or more of the other parameters. Each set of gathered operational data/parameters may be associated with the specific simulated computing device state from which they were produced so that they may be later used to select the preferred core combinations for the same or similar computing device state of an operational computing device.

In block 506, a preferred core combination for each of the multi-core processor chips used in the simulations of the computing device states may be determined for each of the simulated computing device states. This determination may be made based on analyses of the operational data of the processor cores from the simulations based on varying goals for optimization. For example, the goals for optimization may include maximized processing speed, minimized power consumption, or an efficiency level based on various combinations of processing speed for given power consumption levels or power profiles. The operational data of the processor cores on each multi-core processor may be analyzed to determine which combination of the processor cores of the multi-core processor is preferred for a specific goal for optimization. The determination of the preferred combination of processor cores may be influenced by a limitation of the number of processor cores to be used in the combination. For example, some aspects may involve use of software that is generally optimized for dual-core processing. Therefore, the determination of the preferred combination of processor cores may be limited to two processor cores. Even in this situation, preferred combinations of more than two processor cores may be selected to help determine the power up sequence, or bring-up sequence, of the rest of the processor cores if needed.

Continuing with the example discussed above with reference to FIGS. 4A and 4B, the preferred combination of processor cores may be determined for a goal of optimization based on the current leakage of each of the processor cores. These operational data of the processor cores that make up the preferred core combinations may comprise data for plotting on the graph 400a in FIG. 4A. For example, the ratio of the current leakage of core 1 to core 2 and the ratio of the current leakage of core 3 to core 2 for a processor where the preferred core combination is determined to be core 0 and core 2 will result in a point plotted in sector 404. Plotting the points for some or all of the multi-core processors used in the simulation may result in the sectors 402, 404, 406, as illustrated in FIG. 4B and described above. The sectors 402, 404, 406, may define groups of the multi-core processors with the same combination of preferred processor cores of the simulated computing device state.

In block 508, the boundaries of the groups of multi-core processor with the same combination of preferred processor cores for the simulated states may be determined. In an aspect, these boundaries may be defined in terms of the ratios of the parameters of the processor cores to the parameters of the other processor cores. The boundaries may represent terminal values of the comparisons of the parameters of the processor cores associated with the combinations of preferred processor cores. In block 510, the boundaries for the simulated device states may be stored to a memory device (e.g., ROM) of the multi-core processor or the computing device containing the multi-core processor. Storing the boundary values may also include storing the association of the boundary values with the combination of preferred processor cores. The association of the boundaries with the combinations of preferred processor cores may be used in an operable computing device to determine which combination of processor cores is preferred for a state of the computing device based on a comparison of the parameters of the operational processor cores.

Figure 6:
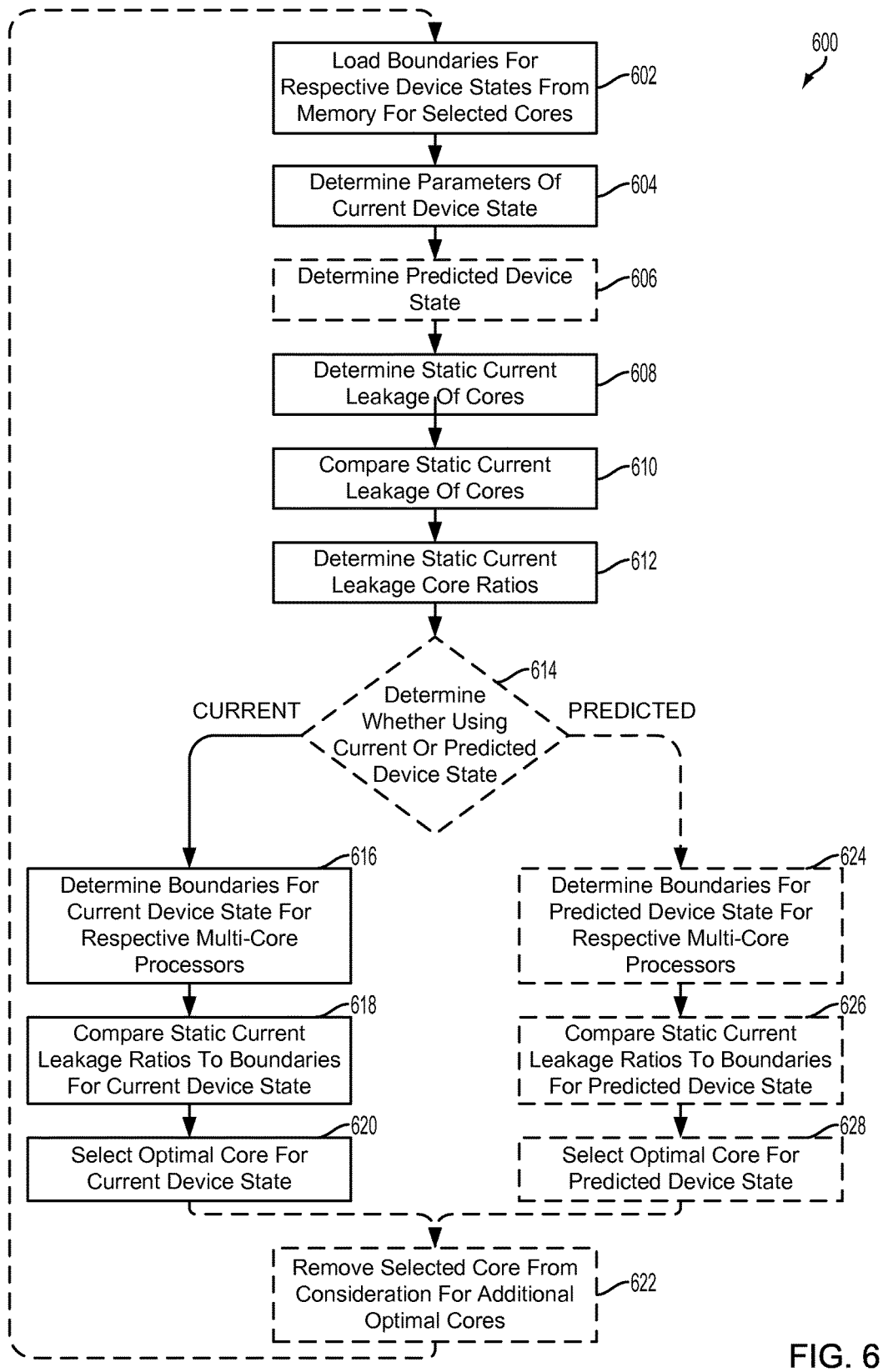
FIG. 6 is a process flow diagram illustrating an aspect method for selecting preferred processor core combinations for a state of a computing device.

FIG. 6 illustrates an aspect method 600 for selecting preferred processor core combinations for an operating state and/or condition of a computing device. The method 600 may be executed in a computing device using software, general purpose or dedicated hardware, or a combination of software and hardware. For example, an operating system kernel or scheduler executing on a processor (e.g., one of the processor cores of a multi-core processor) may implement the method 600. In an aspect, the boundary values and the set to preferred processor cores for various states of the computing device may be stored in one or more of the memories of the computing device. The boundary values and the sets of preferred processor cores stored in the memory may be specific to the multi-core processor(s) of the computing device. In block 602, the computing device may load some or all of the boundary values and their related sets of processor cores from the memory of the computing device. This information may be loaded to a faster memory of the SoC or of a specific multi-core processor. The information loaded to the memory of the SoC may include all or some of the boundaries and sets of preferred processor cores, or only the sets of the boundaries and sets of preferred processor cores that relate specifically to the multi-core processors of the SoC. The information loaded to the memory of the specific multi-core processor may include the information that relates specifically to that multi-core processor.

In block 604, the computing device may determine parameters that represent the computing device's current state. As discussed above relating to the simulations of the states of the computing device, these parameters of the computing device may include temperature, work load, power availability, power consumption, and operating frequency. In an aspect, determining at least some of these parameters may involve measuring the parameters from sensor readings or other signals. In an aspect, determining at least some of these parameters may involve retrieving values of the parameters from hardware or software components of the computing device. The computing device parameters may be for the computing device as a whole, or for particular components of the computing device, such as the multi-core processors. The state of the computing device may be determined from one or a combination of these parameters. In an aspect, in optional block 606, the computing device may determine a predicted computing device state for certain conditions of a time for which the computing device may attempt to select the combination of preferred cores. Determining the predicted computing device state may include calculating the parameters of the computing device using the current parameters of the computing device.

In block 608, the computing device may determine parameters of the processor cores of a multi-core processor. As discussed above, these parameters may include processing speed/operational frequency, power consumption, temperature, current leakage, or efficiency based on a combination of these parameters. In an aspect, some of the parameters may be used to calculate one or more of the other parameters. Continuing with the previous examples, the determined parameter, measured, retrieved from hardware or software, or calculated, may be the current leakage of the processor cores. In an aspect the current leakage for each of the processor cores may be stored in a storage device of the multi-core processor, which may include storage devices of the individual processor cores. Such a storage device may include the above described memories, or an eFUSE.

In block 610, the computing device may compare the parameters of the processing cores. Using the current leakage as the parameter of the processing cores for comparison, the computing device may compare the current leakage of each processor core of the multi-core processor to the current leakage of each of the other processor cores of the multi-core processor. In an aspect, the comparison may include determining a ratio of each of the processor cores in block 612, such as a comparison of the current leakage for each combination of processor cores.

In optional determination block 614, the computing device may determine whether the combination for preferred processor cores may be found for the current state of the computing device or the predicted state of the computing device. This determination may be based on various factors, which may include the configuration of the computing device and/or a program executing on the computing device, or one or more of the state parameters of the computing device. For example, a software program executing on the computing device may be configured to request a combination of the preferred cores for a predicted state for executing a feature of the software. The computing device may use the information to determine whether to execute the feature. Another example may include a state parameter indicating a diminishing power availability profile or high temperature. The computing device may determine to use the current state to find the combination of preferred processor cores that may reduce the rate of power consumption or temperature of the computing device.

In response to the computing device determining to use the current state of the computing device (i.e. determination block 614="Current"), the computing device may determine the boundaries of the current device state for the multi-core processor in block 616. In other words, the computing device may retrieve from memory the boundaries and sets of preferred processor cores associated with the current state of the computing device. In an aspect in which the information is stored in memory for a number of multi-core processors, the computing device may retrieve the information that is also associated with a specific multi-core processor.

In block 618, the computing device may compare the ratios of the parameters, in this example the current leakage, for each combination of the processor cores to the related boundary information. In an aspect, comparing the ratios to the related boundary information may include using the inequalities as described above. In an aspect, the computing device may compare all of the ratios to the respective boundary information. In another aspect, the computing device may compare all of the ratios to the respective boundary information until the inequality is true for at least a pair of ratios. In an aspect, the pair of the ratios may include any pair of ratios where the ratio of a first core to a second core and the ratio of a third core to the second core both result in the true inequality for their respective boundary information.

In block 620, the computing device may select a preferred core for the current state of the computing device associated with the boundary information of the true inequalities. As discussed above, the boundary information may be associated with a set of preferred cores. The identification of the boundary values for which the inequalities are true may be used to identify the sets of preferred cores for each of the boundary values of the true inequalities. The preferred processor core selected from the sets may be a preferred processor core that exists in all of the sets associated with the boundary values of the true inequalities.

In an aspect, additional preferred cores may be combined with the previously selected preferred core. In optional block 622, the computing device may remove the selected preferred core from consideration for the additional preferred cores. Removing the selected preferred core from consideration may avoid reselection of that same core in the future. This may also result in fewer calculations, thereby reducing power consumption and speeding up the selection of the additional processor cores. The computing device may repeat the processes for selection preferred cores returning to block 602, which may result in the selection of a different preferred combination of processor cores as the operating state and conditions of the computing device change over time.

In response to the computing device determining to use the predicted state of the computing device (i.e. determination block 614="Predicted"), the computing device may determine the boundaries of the predicted device state for the multi-core processor in block 624. In other words, the computing device may retrieve from the memory, the boundaries and sets of preferred processor cores associated with the predicted state of the computing device. In an aspect where the information is stored in memory for a number of multi-core processors, the computing device may retrieve the information that is associated with a specific multi-core processor.

In block 626, the computing device may compare the ratios of each of the parameters, in this example the current leakage, for each combination of processor cores to the related boundary information as described in block 618. In block 628, the computing device may select a preferred processor core or combinations of processor cores for the predicted state of the computing device associated with the boundary information of the true inequalities as similarly described for the current state in block 620. The computing device may remove the selected preferred core from consideration for the additional preferred core in optional block 622, as described above, and repeat the processes for selecting preferred cores block 602, which may result in the selection of a different preferred combination of processor cores as the operating state and conditions of the computing device change over time.

Figure 7:
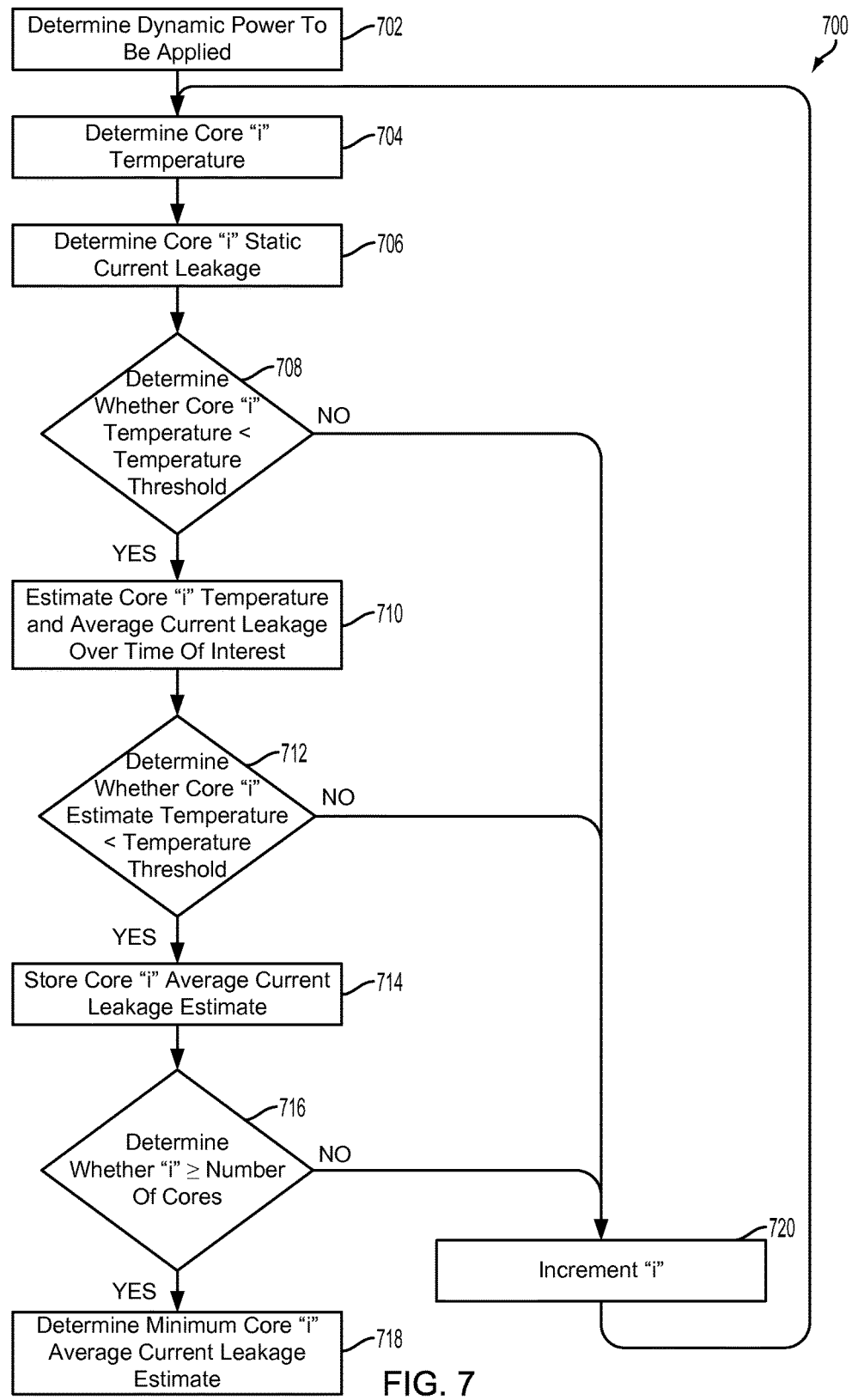
FIG. 7 is a process flow diagram illustrating an aspect method for dynamically determining preferred processor core combinations for a state of a computing device.

FIG. 7 illustrates an aspect method 700 for dynamically determining preferred processor core combinations for a state of a computing device. The method 700 may be executed in a computing device using software, general purpose or dedicated hardware, or a combination of software and hardware. In block 702 the computing device may determine a dynamic power to be applied to the multi-core processor for executing a task. In an aspect, the determination of the dynamic power to be applied may include the dynamic power to be applied to the individual processor cores for executing the task. In block 704, the computing device may determine the temperature of a specific core, herein indicated by the value of the variable "i" and referred to as core "i." The temperature may be measured by a sensor placed close to core "i," estimated from readings from sensors in or near the multi-core processor containing processor core "i," or calculated based on information from various hardware components and/or software. In block 706, the computing device may determine the current leakage of core "i." The current leakage may be determined by reading the value of the current leakage from the core "i," or a memory storing the leakage current of core "i." It may also be possible to calculate the current leakage of core "i" based on measurements or information retrieved from other hardware components and/or software.

In determination block 708, the computing device may determine whether the temperature of core "i" is less than a temperature threshold. In response to determining that the temperature of core "i" is not less than the temperature threshold (i.e. determination block 708="No"), the computing device may increment a value of variable "i," in block 720. The computing device may then return to block 704 to implement the method 700 for the next processor core. In response to determining that the temperature of core "i" is less than the temperature threshold (i.e. determination block 708="Yes"), the computing device may estimate a temperature of core "i" and an average current leakage of core "i" over a time of interest in block 710. In an aspect, the time of interest may be a time expected for the completion of the task.

In determination block 712 the computing device may determine whether the estimated temperature of core "i" is less than the temperature threshold. In response to determining that the estimated temperature of core "i" is not less than the temperature threshold (i.e. determination block 712="No"), the computing device may increment the value of variable "i" in block 720. The computing device may then return to block 704 to implement the method 700 for the next processor core. In response to determining that the estimated temperature of core "i" is less than the temperature threshold (i.e. determination block 712="Yes"), the computing device may store the estimated average current leakage of core "i" in block 714.

In determination block 716 the computing device may determine whether the variable "i" is greater than or equal to a total number of processor cores. In response to determining that the variable "i" is not greater than or equal to the total number or processor cores (i.e. determination block 716="No"), the computing device may increment the value of variable "i" in block 720. The computing device may then repeat the operations of blocks 704 through 716 for the next processor core.

In response to determining that the variable "i" is greater than or equal to the total number of processor cores (i.e., determination block 716="Yes"), the computing device may determine the minimum average current leakage for all of the processor cores, and select the related core "i" as the preferred processor core in block 718. The method 700 may be repeated to select further preferred processor cores to combine with the selected processor core, such as periodically in order to adjust to changes in operating state and condition. Much like method 600, in an aspect, the selected core "i" may be removed from consideration as a preferred processor core in later iterations of the method 700 to avoid duplicate selections of the same processor core and reduce resource and time need to make the selection.

Figure 8:
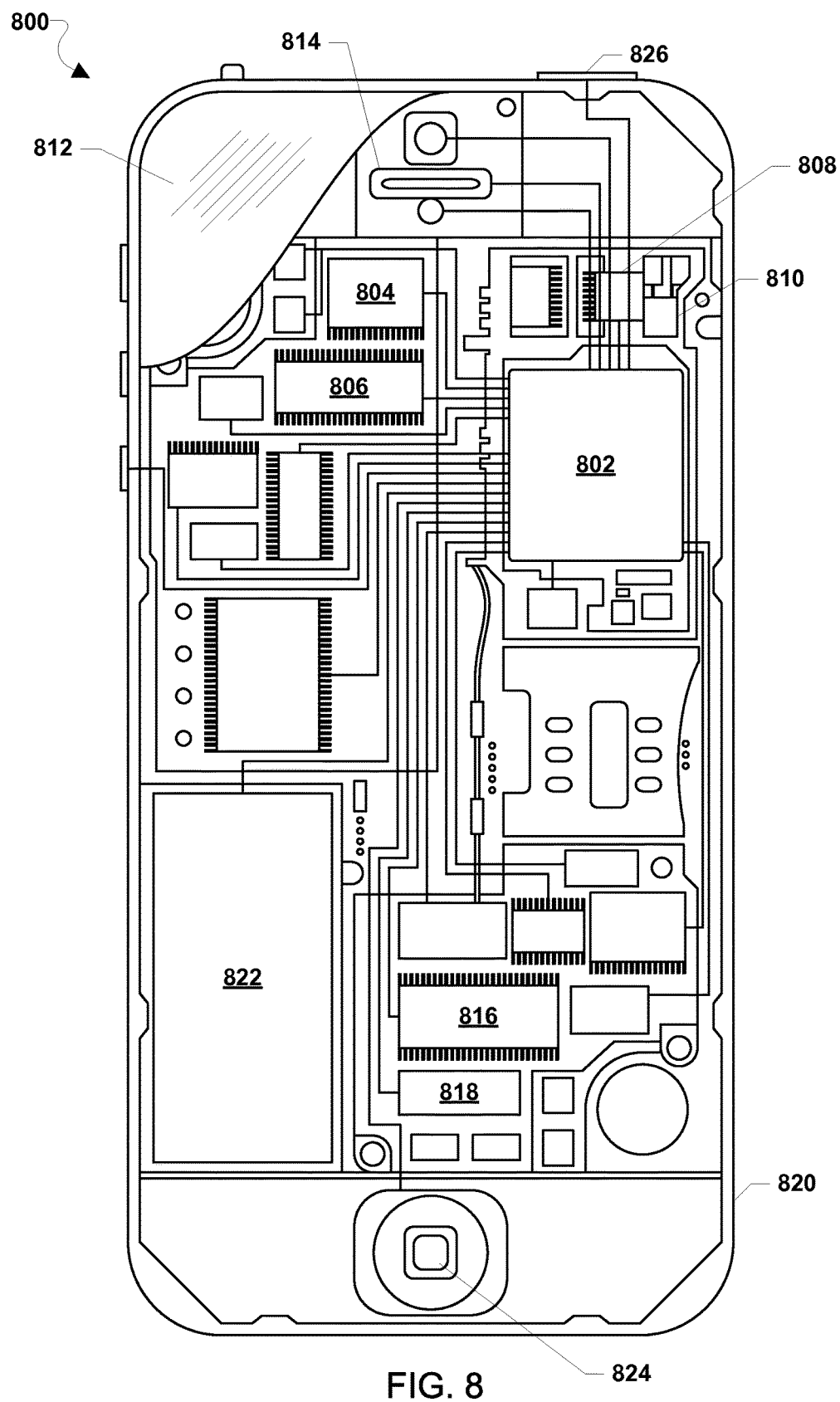
FIG. 8 is component block diagram illustrating an example mobile device suitable for use with the various aspects.

FIG. 8 illustrates an example mobile device suitable for use with the various aspects. The mobile device 800 may include a processor 802 coupled to a touchscreen controller 804 and an internal memory 806. The processor 802 may be one or more multicore integrated circuits designated for general or specific processing tasks. The internal memory 806 may be volatile or non-volatile memory, and may also be secure and/or encrypted memory, or unsecure and/or unencrypted memory, or any combination thereof. Examples of memory types which can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the computing device 800 need not have touch screen capability.

The mobile device 800 may have one or more radio signal transceivers 808 (e.g., Peanut, Bluetooth, Zigbee, Wi-Fi, RF radio) and antennae 810, for sending and receiving communications, coupled to each other and/or to the processor 802. The transceivers 808 and antennae 810 may be used with the above-mentioned circuitry to implement the various wireless transmission protocol stacks and interfaces. The mobile device 800 may include a cellular network wireless modem chip 816 that enables communication via a cellular network and is coupled to the processor.

The mobile device 800 may include a peripheral device connection interface 818 coupled to the processor 802. The peripheral device connection interface 818 may be singularly configured to accept one type of connection, or may be configured to accept various types of physical and communication connections, common or proprietary, such as USB, FireWire, Thunderbolt, or PCIe. The peripheral device connection interface 818 may also be coupled to a similarly configured peripheral device connection port (not shown).

The mobile device 800 may also include speakers 814 for providing audio outputs. The mobile device 800 may also include a housing 820, constructed of a plastic, metal, or a combination of materials, for containing all or some of the components discussed herein. The mobile device 800 may include a power source 822 coupled to the processor 802, such as a disposable or rechargeable battery. The rechargeable battery may also be coupled to the peripheral device connection port to receive a charging current from a source external to the mobile device 800. The mobile device 800 may also include a physical button 824 for receiving user inputs. The mobile device 800 may also include a power button 826 for turning the mobile device 800 on and off.

Figure 9:
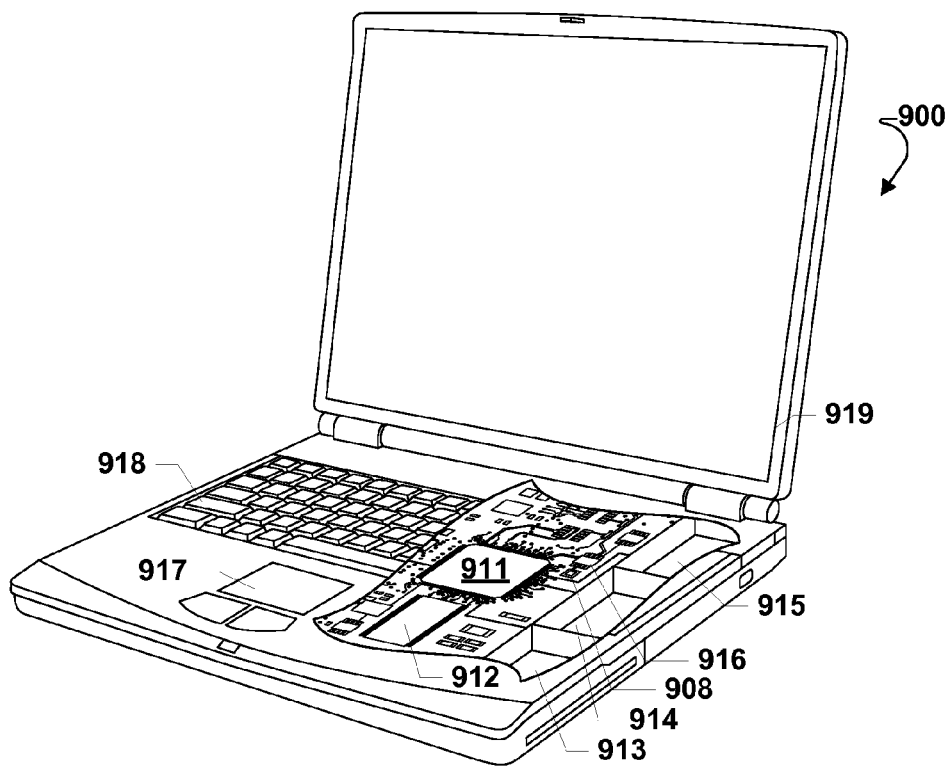
FIG. 9 is component block diagram illustrating an example mobile device suitable for use with the various aspects.

The various aspects described above may also be implemented within a variety of mobile devices, such as a laptop computer 900 illustrated in FIG. 9. Many laptop computers include a touchpad touch surface 917 that serves as the computer's pointing device, and thus may receive drag, scroll, and flick gestures similar to those implemented on computing devices equipped with a touch screen display and described above. A laptop computer 900 will typically include a processor 911 coupled to volatile memory 912 and a large capacity nonvolatile memory, such as a disk drive 913 of Flash memory. Additionally, the computer 900 may have one or more antenna 908 for sending and receiving electromagnetic radiation that may be connected to a wireless data link and/or cellular telephone transceiver 916 coupled to the processor 911. The computer 900 may also include a floppy disc drive 914 and a compact disc (CD) drive 915 coupled to the processor 911. In a notebook configuration, the computer housing includes the touchpad 917, the keyboard 918, and the display 919 all coupled to the processor 911. Other configurations of the computing device may include a computer mouse or trackball coupled to the processor (e.g., via a USB input) as are well known, which may also be used in conjunction with the various aspects.

Figure 10:
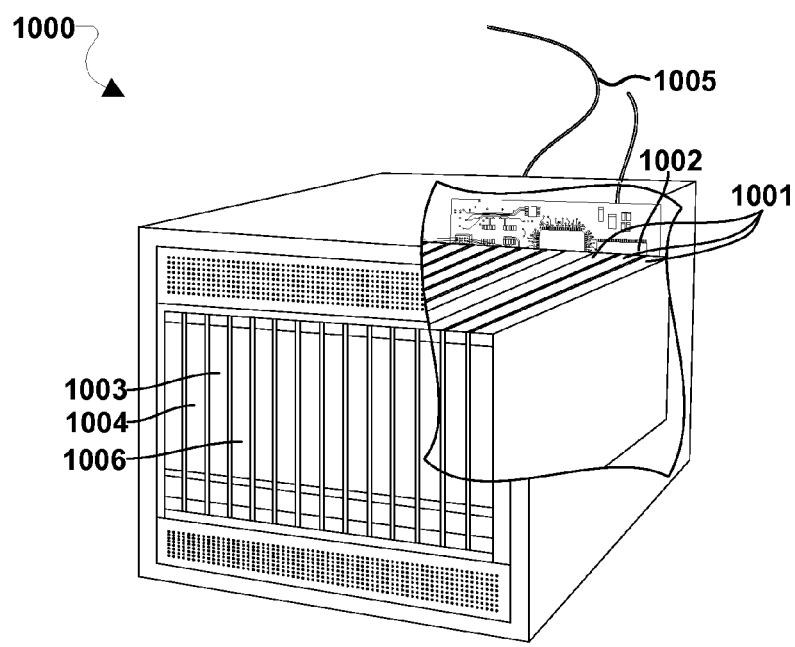
FIG. 10 is component block diagram illustrating an example server device suitable for use with the various aspects.

The various aspects may also be implemented on any of a variety of commercially available server devices, such as the server 1000 illustrated in FIG. 10. Such a server 1000 typically includes one or more multi-core processor assemblies 1001 coupled to volatile memory 1002 and a large capacity nonvolatile memory, such as a disk drive 1004. As illustrated in FIG. 10, multi-core processor assemblies 1001 may be added to the server 1000 by inserting them into the racks of the assembly. The server 1000 may also include a floppy disc drive, compact disc (CD) or DVD disc drive 1006 coupled to the processor 1001. The server 1000 may also include network access ports 1003 coupled to the multi-core processor assemblies 1001 for establishing network interface connections with a network 1005, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many computing devices operating system kernels are organized into a user space (where non-privileged code runs) and a kernel space (where privileged code runs). This separation is of particular importance in Android and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for selecting processor cores of a multi-core processor within a computing device, comprising:
    determining a state of the computing device;
    determining a plurality of ratios of current leakage by comparing a current leakage of each of a plurality of processor cores to current leakages of other processor cores of the plurality of processor cores;
    comparing the plurality of ratios of current leakage to a plurality of boundary values corresponding to the state of the computing device in a plurality of inequalities;
    selecting a processor core associated with at least two boundary values in response to determining that at least two of the plurality of inequalities are true; and
    engaging the selected processor core to execute a task in combination with another processor core.

2. The method of claim 1, wherein:
    determining the plurality of ratios of current leakage by comparing the current leakage of each of the plurality of processor cores to current leakages of other processor cores of the plurality of processor cores comprises:
        determining a first ratio of a current leakage by comparing a current leakage of a first processor core to a current leakage of a second processor core; and
        determining a second ratio of current leakage by comparing a current leakage of a third processor core to the current leakage of the second processor core;
    comparing the plurality of ratios of current leakage to the plurality of boundary values corresponding to the state of the computing device in the plurality of inequalities comprises:
        comparing the first ratio to a first boundary value corresponding to the state of the computing device in a first inequality; and
        comparing the second ratio of current leakage to a second boundary value corresponding to the state of the computing device in a second inequality; and
    selecting the processor core associated with the at least two boundary values in response to determining that the at least two of the plurality of inequalities are true comprises selecting a preferred processor core associated with the first boundary value and the second boundary value in response to determining that the first inequality and the second inequality are true.

3. The method of claim 1, further comprising:
    storing a plurality of boundary values each associated with a state of the computing device and a set of processor cores determined to be preferred for use during the state of the computing device; and
    loading the plurality of boundary values for the state of the computing device.

4. The method of claim 1, further comprising retrieving the current leakage of the plurality of processor cores from a storage device of the multi-core processor.

5. The method of claim 1, wherein selecting the processor core associated with the at least two boundary values in response to determining that the at least two of the plurality of inequalities are true comprises:
    retrieving a plurality of sets of processor cores associated with the at least two boundary values;
    comparing each of the plurality of sets of processor cores with other sets within the plurality of sets of processor cores; and
    selecting the processor core that is present in at least two sets of processor cores within the plurality of sets of processor cores.

6. The method of claim 1, wherein determining the state of the computing device comprises selecting a current state of the computing device or a predicted state of the computing device.

7. The method of claim 1, further comprising composing a processor core bring-up sequence wherein the selected processor core is next in the processor core bring-up sequence.

8. The method of claim 1, wherein determining the plurality of ratios of current leakage by comparing the current leakage of each of the plurality of processor cores to current leakages of other processor cores of the plurality of processor cores comprises:
    expressing the plurality of ratios of current leakage as ratios of static current leakage in a digital domain at a quiescent state (IDDq) for each of the plurality of processor cores such that the plurality of ratios of current leakage include $IDDq_{i+1}/IDDq_i$, $IDDq_{i+2}/IDDq_i$, $IDDq_{i+3}/IDDq_i$, $IDDq_{i+4}/IDDq_i$, $IDDq_n/IDDq_i$.

9. A computing device, comprising:
    a processor configured with processor-executable instructions to perform operations comprising:
        determining a state of the computing device;
        determining a plurality of ratios of current leakage by comparing a current leakage of each of a plurality of processor cores to current leakages of other processor cores of the plurality of processor cores;
        comparing the plurality of ratios of current leakage to a plurality of boundary values corresponding to the state of the computing device in a plurality of inequalities;
        selecting a processor core associated with at least two boundary values in response to determining that at least two of the plurality of inequalities are true; and
        engaging the selected processor core to execute a task in combination with another processor core.

10. The computing device of claim 9, wherein the processor is further configured with processor-executable instructions to perform operations such that:
    determining the plurality of ratios of current leakage by comparing the current leakage of each of the plurality of processor cores to current leakages of other processor cores of the plurality of processor cores comprises:
  determining a first ratio of a current leakage by comparing a current leakage of a first processor core to a current leakage of a second processor core; and
  determining a second ratio of current leakage by comparing a current leakage of a third processor core to the current leakage of the second processor core;
comparing the plurality of ratios of current leakage to the plurality of boundary values corresponding to the state of the computing device in the plurality of inequalities comprises:
  comparing the first ratio to a first boundary value corresponding to the state of the computing device in a first inequality; and
  comparing the second ratio of current leakage to a second boundary value corresponding to the state of the computing device in a second inequality; and
selecting the processor core associated with the at least two boundary values in response to determining that the at least two of the plurality of inequalities are true comprises selecting a preferred processor core associated with the first boundary value and the second boundary value in response to determining that the first inequality and the second inequality are true.

11. The computing device of claim 9, further comprising a memory communicatively connected to the processor, and wherein the processor is further configured with processor-executable instructions to perform operations further comprising:
  storing a plurality of boundary values each associated with a state of the computing device and a set of processor cores determined to be preferred for use during the state of the computing device in the memory; and
  loading the plurality of boundary values for the state of the computing device from the memory.

12. The computing device of claim 9, further comprising a storage device communicatively connected to the processor, and wherein the processor is further configured with processor-executable instructions to perform operations further comprising retrieving the current leakage of the plurality of processor cores from the storage device.

13. The computing device of claim 9, wherein the processor is further configured with processor-executable instructions to perform operations such that selecting the processor core associated with the at least two boundary values in response to determining that the at least two of the plurality of inequalities are true comprises:
  retrieving a plurality of sets of processor cores associated with the at least two boundary values;
  comparing each of the plurality of sets of processor cores with other sets within the plurality of sets of processor cores; and
  selecting the processor core that is present in at least two sets of processor cores within the plurality of sets of processor cores.

14. The computing device of claim 9, wherein the processor is further configured with processor-executable instructions to perform operations such that determining the state of the computing device comprises selecting a current state of the computing device or a predicted state of the computing device.

15. The computing device of claim 9, wherein the processor is further configured with processor-executable instructions to perform operations further comprising composing a processor core bring-up sequence wherein the selected processor core is next in the processor core bring-up sequence.

16. A non-transitory processor-readable medium having stored thereon processor-executable software instructions to cause a processor to perform operations comprising:
  determining a state of a computing device;
  determining a plurality of ratios of current leakage by comparing a current leakage of each of a plurality of processor cores to current leakages of other processor cores of the plurality of processor cores;
  comparing the plurality of ratios of current leakage to a plurality of boundary values corresponding to the state of the computing device in a plurality of inequalities;
  selecting a processor core associated with at least two boundary values in response to determining that at least two of the plurality of inequalities are true; and
  engaging the selected processor core to execute a task in combination with another processor core.

17. The non-transitory processor-readable medium of claim 16, wherein the stored processor-executable software instructions are configured to cause the processor to perform operations such that:
  determining the plurality of ratios of current leakage by comparing the current leakage of each of the plurality of processor cores to current leakages of other processor cores of the plurality of processor cores comprises:
    determining a first ratio of a current leakage by comparing a current leakage of a first processor core to a current leakage of a second processor core; and
    determining a second ratio of current leakage by comparing a current leakage of a third processor core to the current leakage of the second processor core;
  comparing the plurality of ratios of current leakage to the plurality of boundary values corresponding to the state of the computing device in the plurality of inequalities comprises:
    comparing the first ratio to a first boundary value corresponding to the state of the computing device in a first inequality; and
    comparing the second ratio of current leakage to a second boundary value corresponding to the state of the computing device in a second inequality; and
  selecting the processor core associated with the at least two boundary values in response to determining that the at least two of the plurality of inequalities are true comprises selecting a preferred processor core associated with the first boundary value and the second boundary value in response to determining that the first inequality and the second inequality are true.

18. The non-transitory processor-readable medium of claim 16, wherein the stored processor-executable software instructions are configured to cause the processor to perform operations further comprising:
  storing a plurality of boundary values each associated with a state of the computing device and a set of processor cores determined to be preferred for use during the state of the computing device; and
  loading the plurality of boundary values for the state of the computing device.

19. The non-transitory processor-readable medium of claim 16, wherein the stored processor-executable software instructions are configured to cause the processor to perform operations further comprising retrieving the current leakage of the plurality of processor cores from a storage device of a multi-core processor.

20. The non-transitory processor-readable medium of claim 16, wherein the stored processor-executable software instructions are configured to cause the processor to perform operations such that selecting the processor core associated with the at least two boundary values in response to determining that the at least two of the plurality of inequalities are true comprises:
    retrieving a plurality of sets of processor cores associated with the at least two boundary values;
    comparing each of the plurality of sets of processor cores with other sets within the plurality of sets of processor cores; and
    selecting the processor core that is present in at least two sets of processor cores within the plurality of sets of processor cores.

21. The non-transitory processor-readable medium of claim 16, wherein the stored processor-executable software instructions are configured to cause the processor to perform operations such that determining the state of the computing device comprises selecting a current state of the computing device or a predicted state of the computing device.

22. The non-transitory processor-readable medium of claim 16, wherein the stored processor-executable software instructions are configured to cause the processor to perform operations further comprising composing a processor core bring-up sequence wherein the selected processor core is next in the processor core bring-up sequence.

23. A computing device, comprising:
    means for determining a state of the computing device;
    means for determining a plurality of ratios of current leakage by comparing a current leakage of each of a plurality of processor cores to current leakages of other processor cores of the plurality of processor cores;
    means for comparing the plurality of ratios of current leakage to a plurality of boundary values corresponding to the state of the computing device in a plurality of inequalities;
    means for selecting a processor core associated with at least two boundary values in response to determining that at least two of the plurality of inequalities are true; and
    means for engaging the selected processor core to execute a task in combination with another processor core.

24. The computing device of claim 23, wherein:
    means for determining the plurality of ratios of current leakage by comparing the current leakage of each of the plurality of processor cores to current leakages of other processor cores of the plurality of processor cores comprises:
        means for determining a first ratio of a current leakage by comparing a current leakage of a first processor core to a current leakage of a second processor core; and
        means for determining a second ratio of current leakage by comparing a current leakage of a third processor core to the current leakage of the second processor core;
    means for comparing the plurality of ratios of current leakage to the plurality of boundary values corresponding to the state of the computing device in the plurality of inequalities comprises:
        means for comparing the first ratio to a first boundary value corresponding to the state of the computing device in a first inequality; and
        means for comparing the second ratio of current leakage to a second boundary value corresponding to the state of the computing device in a second inequality; and
    means for selecting the processor core associated with the at least two boundary values in response to determining that the at least two of the plurality of inequalities are true comprises means for selecting a preferred processor core associated with the first boundary value and the second boundary value in response to determining that the first inequality and the second inequality are true.

25. The computing device of claim 23, further comprising:
    means for storing a plurality of boundary values each associated with a state of the computing device and a set of processor cores determined to be preferred for use during the state of the computing device; and
    means for loading the plurality of boundary values for the state of the computing device.

26. The computing device of claim 23, further comprising means for retrieving the current leakage of the plurality of processor cores from a storage device of a multi-core processor.

27. The computing device of claim 23, wherein means for selecting the processor core associated with the at least two boundary values in response to determining that the at least two of the plurality of inequalities are true comprises:
    means for retrieving a plurality of sets of processor cores associated with the at least two boundary values;
    means for comparing each of the plurality of sets of processor cores with other sets within the plurality of sets of processor cores; and
    means for selecting the processor core that is present in at least two sets of processor cores within the plurality of sets of processor cores.

28. The computing device of claim 23, wherein means for determining the state of the computing device comprises means for selecting a current state of the computing device or a predicted state of the computing device.

29. The computing device of claim 23, further comprising means for composing a processor core bring-up sequence wherein the selected processor core is next in the processor core bring-up sequence.

* * * * *